(12) United States Patent
Sethia et al.

(10) Patent No.: US 12,431,964 B2
(45) Date of Patent: Sep. 30, 2025

(54) SYSTEM AND METHOD FOR INTERACTION SYSTEM RESILIENCY BY AGGREGATION WITH HETEROGENOUS COMMUNICATION NETWORKS

(71) Applicant: BANK OF AMERICA CORPORATION, Charlotte, NC (US)

(72) Inventors: Maneesh Sethia, Telangana (IN); Sandeep Kumar Chauhan, Miyapur Hyderabad (IN); Saurabh Arora, Gurugram (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 360 days.

(21) Appl. No.: 18/136,159

(22) Filed: Apr. 18, 2023

(65) Prior Publication Data

US 2024/0356629 A1 Oct. 24, 2024

(51) Int. Cl.
*H04B 7/185* (2006.01)
*H04B 17/318* (2015.01)
*H04W 24/08* (2009.01)
*H04W 84/04* (2009.01)
*H04W 84/06* (2009.01)

(52) U.S. Cl.
CPC ......... *H04B 7/1851* (2013.01); *H04B 17/318* (2015.01); *H04W 24/08* (2013.01); *H04W 84/042* (2013.01); *H04W 84/06* (2013.01)

(58) Field of Classification Search
CPC ... H04B 17/318; H04B 7/1851; H04W 24/08; H04W 84/042; H04W 84/06
See application file for complete search history.

(56) References Cited

U.S. PATENT DOCUMENTS

| | | | |
|---|---|---|---|
| 7,760,664 B2 | 7/2010 | Gupta | |
| 7,831,481 B2 | 11/2010 | Rodriguez et al. | |
| 9,094,314 B2 | 7/2015 | Martin et al. | |
| 9,760,874 B2 | 9/2017 | Zaidi et al. | |
| 9,965,758 B2 | 5/2018 | Zaidi et al. | |
| 11,040,786 B2 | 6/2021 | Kaen | |
| 11,394,733 B2 | 7/2022 | Sloane et al. | |

(Continued)

*Primary Examiner* — Benjamin H Elliott, IV
(74) *Attorney, Agent, or Firm* — Moore & Van Allen PLLC; Nicholas C. Russell

(57) ABSTRACT

Systems, computer program products, and methods are described herein for system resiliency by aggregation with heterogenous communication networks. The method includes transmitting an interaction request associated with an interaction initiation device through a low earth orbit satellite network upon determining a cellular network associated with the interaction initiation device is unavailable. The method also includes receiving a plurality of data packets from the interaction initiation device. At least one of the plurality of data packets are received via the low earth orbit satellite network, and one or more of the plurality of data packets include identifying characteristics associated with the interaction initiation device. The method further includes consolidating the plurality of data packets received via the low earth orbit satellite network. The method still further includes causing an execution of the requested interaction by transmitting a confirmation indicator to the interaction initiation device via the low earth orbit satellite network.

20 Claims, 6 Drawing Sheets

(56) References Cited

U.S. PATENT DOCUMENTS

| | | | |
|---|---|---|---|
| 2002/0128952 A1 | 9/2002 | Melkomian et al. | |
| 2004/0103038 A1* | 5/2004 | Power | G06Q 30/0613 |
| | | | 705/26.41 |
| 2005/0261980 A1* | 11/2005 | Hadi | G06Q 30/0617 |
| | | | 705/27.2 |
| 2006/0067236 A1* | 3/2006 | Gupta | H04L 41/12 |
| | | | 709/227 |
| 2007/0061223 A1* | 3/2007 | Rodriguez | G06Q 30/0605 |
| | | | 705/26.8 |
| 2011/0256849 A1* | 10/2011 | Dutta | H04B 7/18563 |
| | | | 455/411 |
| 2014/0105100 A1* | 4/2014 | Tronc | H04B 7/195 |
| | | | 370/321 |
| 2017/0012814 A1* | 1/2017 | Zaidi | H04L 41/5061 |
| 2017/0012840 A1* | 1/2017 | Zaidi | G06Q 20/1085 |
| 2020/0277087 A1* | 9/2020 | Kaen | B64G 1/242 |
| 2020/0382923 A1* | 12/2020 | Khan | H04B 7/1851 |
| 2021/0036769 A1* | 2/2021 | Sorond | H04B 7/18519 |
| 2021/0144163 A1* | 5/2021 | Sloane | H04L 63/102 |
| 2024/0031984 A1* | 1/2024 | Li | H04W 68/02 |
| 2024/0356629 A1* | 10/2024 | Sethia | H04B 7/1851 |
| 2024/0365199 A1* | 10/2024 | Saglam | H04B 7/18563 |

\* cited by examiner

SYSTEM AND METHOD FOR INTERACTION SYSTEM RESILIENCY BY AGGREGATION WITH HETEROGENOUS COMMUNICATION NETWORKS

TECHNOLOGICAL FIELD

Example embodiments of the present disclosure relate generally to interaction system resiliency and, more particularly, to interaction system resiliency by aggregation with heterogenous communication networks.

BACKGROUND

Digital interactions have a strong dependency on network availability to be able to transmit information from one device to another. Transmission of digital interactions have encountered difficulties due to underdeveloped cellular infrastructure. Through applied effort, ingenuity, and innovation, many of these identified problems have been solved by developing solutions that are included in embodiments of the present disclosure, many examples of which are described in detail herein BRIEF SUMMARY Systems, methods, and computer program products are provided for interaction system resiliency by aggregation with heterogenous communication networks.

In an example embodiment, a system for resiliency by interaction aggregation with heterogenous communication networks is provided. The system includes at least one non-transitory storage device and at least one processing device coupled to the at least one non-transitory storage device. The at least one processing device is configured to transmit an interaction request associated with an interaction initiation device through a low earth orbit satellite network upon determining a cellular network associated with the interaction initiation device is unavailable. The at least one processing device is further configured to receive a plurality of data packets from the interaction initiation device associated with the requested interaction. At least one of the plurality of data packets are received via the low earth orbit satellite network. One or more of the plurality of data packets include identifying characteristics associated with the interaction initiation device. The at least one processing device is further configured to consolidate the plurality of data packets received via the low earth orbit satellite network. The at least one processing device is still further be configured to cause an execution of the requested interaction by transmitting a confirmation indicator to the interaction initiation device via the low earth orbit satellite network.

In various embodiments, in assessing a bandwidth and connection strength of the cellular network to the interaction initiation device, the at least one processing device is configured to transmit the interaction request associated with the interaction initiation device through the low earth orbit satellite network after a predetermined length of time has passed since the confirmation indicator has been received by the interaction initiation device prior to an attempted transmission through the cellular network. The at least one processing device is configured to consolidate the plurality of data packets associated with the interaction initiation device received from the cellular network and the low earth orbit satellite network. The at least one processing device is configured to recover the plurality of data packets associated with the requested interaction sent through the cellular network in an instance in which the predetermined length of time has passed since the confirmation indicator has been received by the interaction initiation device prior to the attempted transmission through the cellular network.

In various embodiments, the at least one processing device is configured to cause a transmission associated with the interaction request to the interaction initiation device on whether the requested interaction should be processed through the low earth orbit satellite network or wait until an assessment of the bandwidth strength and connection strength of the cellular network is determined to be capable of processing a requested interaction.

In various embodiments, consolidation of the plurality of data packets includes determining whether the plurality of data packets received are associated with the same requested interaction based on the identifying characteristics associated with the interaction initiation device.

In various embodiments, the at least one processing device is configured to verify the interaction initiation device and the requested interaction through the data packets including identifying characteristics associated with the interaction initiation device.

In various embodiments, the confirmation indicator updates a source of records with the requested interaction request.

In various embodiments, the unavailable cellular network associated with the interaction initiation device is a cellular network with a low strength connection to the associated interaction initiation device.

In another example embodiment, a computer program product for resiliency by interaction aggregation with heterogenous communication networks is provided. The computer program product includes at least one non-transitory computer-readable medium having computer-readable program code portions embodied therein. The computer-readable program code portions include an executable portion configured to transmit an interaction request associated with an interaction initiation device through a low earth orbit satellite network upon determining a cellular network associated with the interaction initiation device is unavailable. The computer-readable program code portions also include an executable portion configured to receive a plurality of data packets from the interaction initiation device associated with the requested interaction. At least one of the plurality of data packets are received via the low earth orbit satellite. One or more of the plurality of data packets include identifying characteristics associated with the interaction initiation device. The computer-readable program code portions further include an executable portion configured to consolidate the plurality of data packets received via the low earth orbit satellite network. The computer-readable program code portions include an executable portion configured to cause an execution of the requested interaction by transmitting a confirmation indicator to the interaction initiation device via the low earth orbit satellite network.

In various embodiments, the computer program product further includes an executable portion configured to transmit the interaction request associated with the interaction initiation device through the low earth orbit satellite network after a predetermined length of time has passed since the confirmation indicator has been received by the interaction initiation device prior to an attempted transmission through the cellular network. The computer-readable code portions further include an executable portion configured to consolidate the plurality of data packets associated with the interaction initiation device received from the cellular network and the low earth orbit satellite network. The computer-readable code portions further include an executable portion configured to recover the plurality of data packets associated with the requested interaction transmitted through the cellular network wherein the predetermined length of time has passed since the confirmation indicator has been received by the interaction initiation device prior to the attempted transmission through the cellular network.

In various embodiments, the computer program product further includes an executable portion configured to cause a transmission associated with the interaction request to the interaction initiation device on whether the requested interaction should be processed through the low earth orbit satellite network or wait until an assessment of the bandwidth and connection strength of the cellular network is determined to be capable of processing a requested interaction.

In various embodiments, the consolidation of the plurality of data packets comprises determining whether the plurality of data packets received are associated with the same requested interaction based on the identifying characteristics associated with the interaction initiation device.

In various embodiments, the computer program product further includes an executable portion configured to verify the interaction initiation device and the requested interaction through the data packets comprising identifying characteristics associated with the interaction initiation device.

In various embodiments, the confirmation indicator updates a source of records with the requested interaction request.

In various embodiments, the unavailable cellular network associated with the interaction initiation device is a cellular network with a low strength connection to the associated interaction initiation device.

In yet another example embodiment, a method for resiliency by interaction aggregation with heterogenous communication networks is provided. The method includes transmitting an interaction request associated with an interaction initiation device through a low earth orbit satellite network upon determining a cellular network associated with the interaction initiation device is unavailable. The method also includes receiving a plurality of data packets from the interaction initiation device associated with the requested interaction At least one of the plurality of data packets are received via the low earth orbit satellite network. One or more of the plurality of data packets include identifying characteristics associated with the interaction initiation device. The method further includes consolidating the plurality of data packets received via the low earth orbit satellite network and available cellular network. The method still further includes causing an execution of the requested interaction by transmitting a confirmation indicator to the interaction initiation device via the low earth orbit satellite network.

In various embodiments, the method also includes transmitting the interaction request associated with the interaction initiation device through the low earth orbit satellite network after a predetermined length of time has passed since the confirmation indicator has been received by the interaction initiation device prior to an attempted transmission through the cellular network. The method further includes consolidating the plurality of data packets associated with the interaction initiation device received from the cellular network and the low earth orbit satellite network. The method still further includes recovering the plurality of data packets associated with the requested interaction transmitted through the cellular network wherein the predetermined length of time has passed since the confirmation indicator has been received by the interaction initiation device prior to the attempted transmission through the cellular network.

In various embodiments, the method also includes causing a transmission associated with the interaction request to the interaction initiation device on whether the requested interaction should be processed through the low earth orbit satellite network or wait until an assessment of the bandwidth and connection strength of the cellular network is determined to be capable of processing a requested interaction.

In various embodiments, the method also includes consolidation of the plurality of data packets comprises determining whether the plurality of data packets received are associated with the same requested interaction based on the identifying characteristics associated with the interaction initiation device.

In various embodiments, the method also includes verifying the interaction initiation device and the requested interaction through the data packets comprising identifying characteristics associated with the interaction initiation device.

In various embodiments, the method also includes updating a source of records with the requested interaction request.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
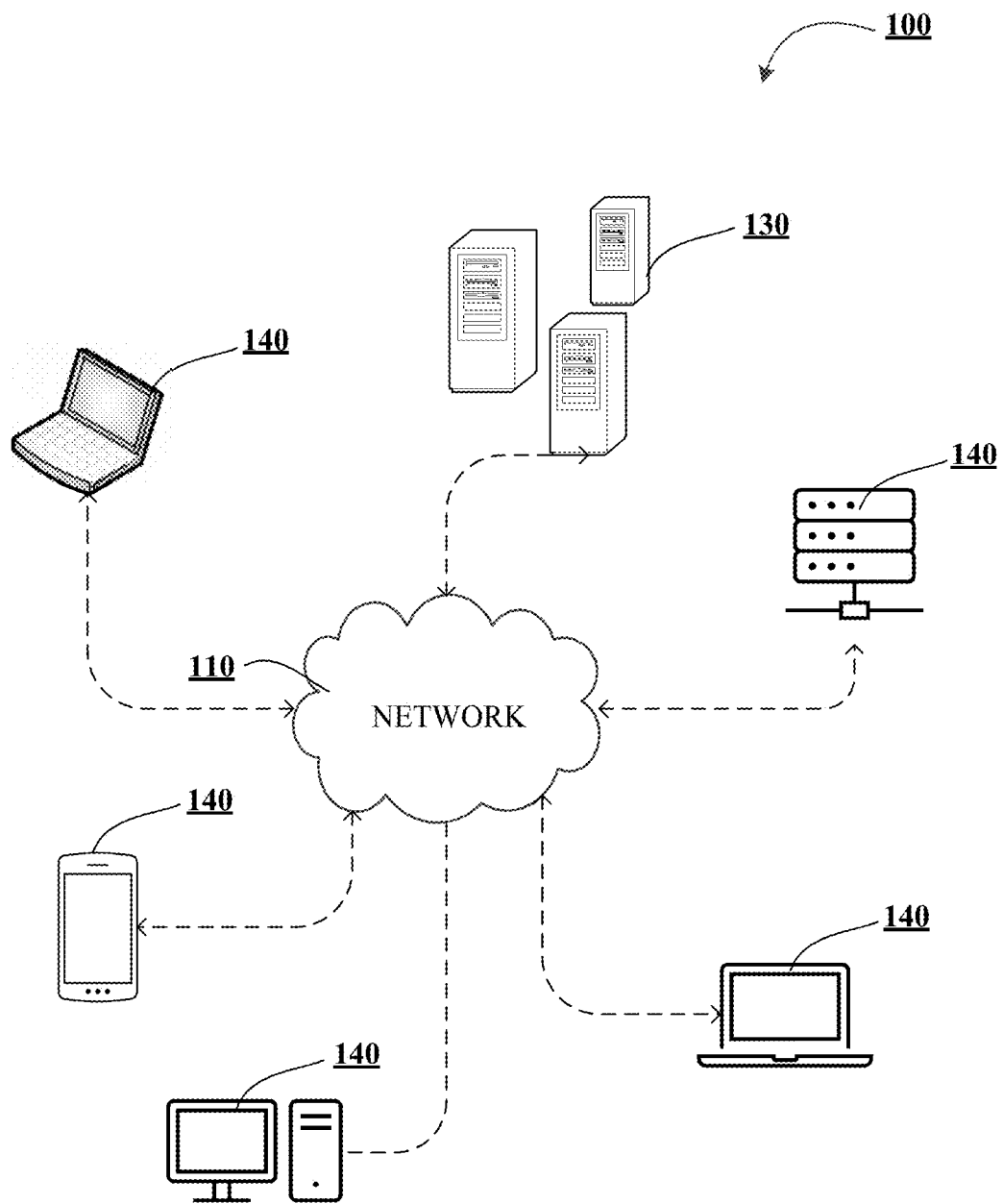
Figure 1B:
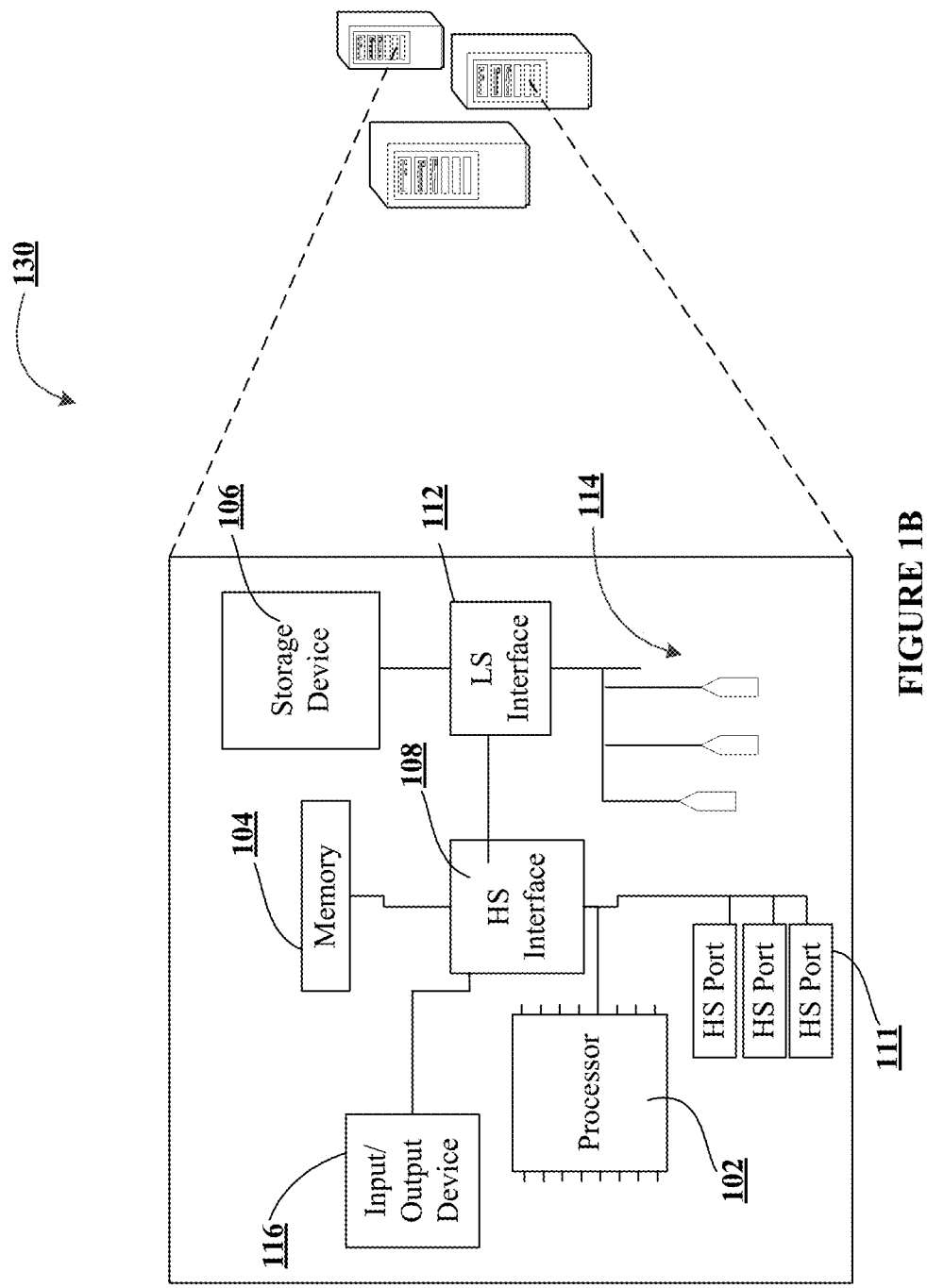
Figure 1C:
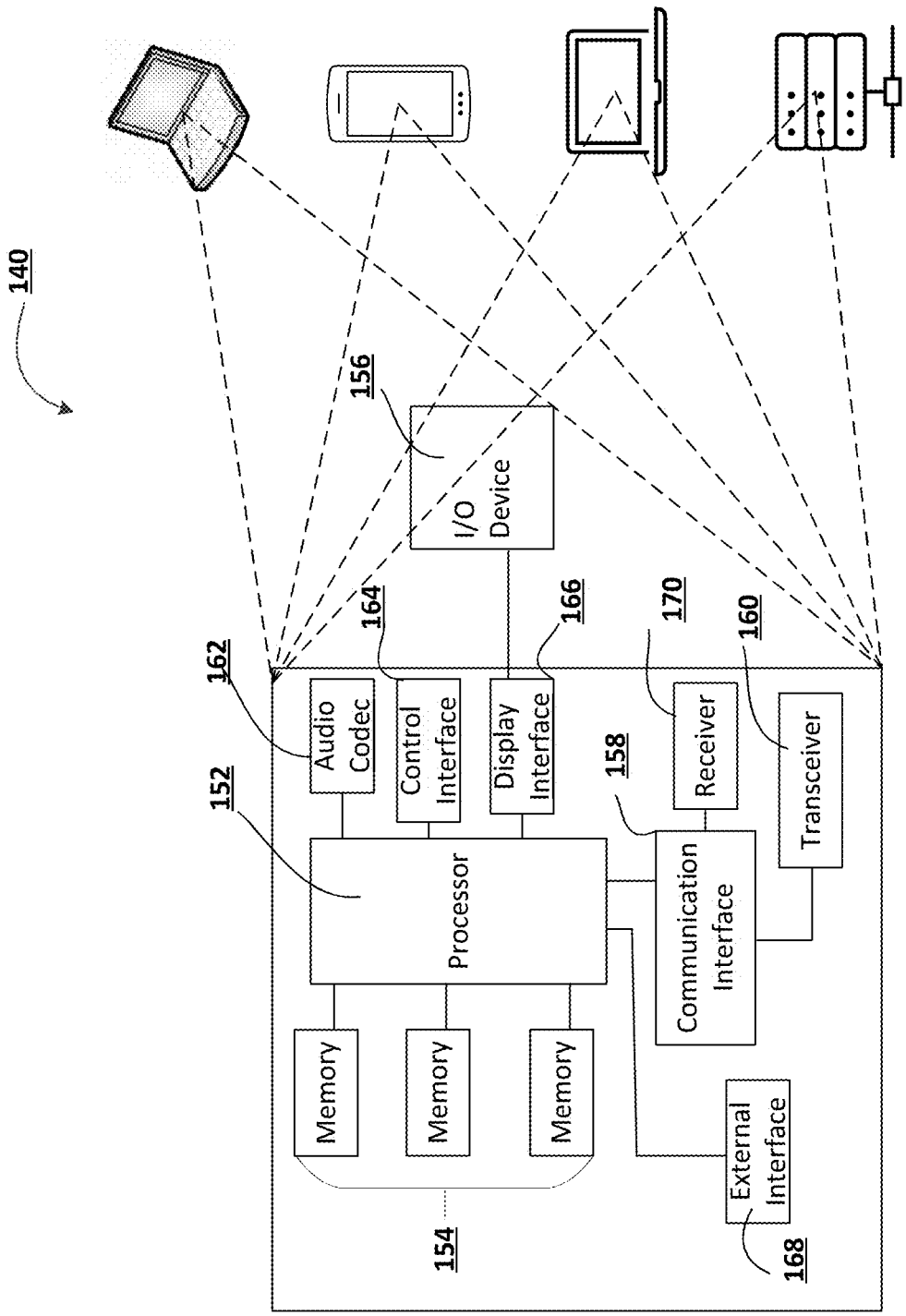
Figure 2:
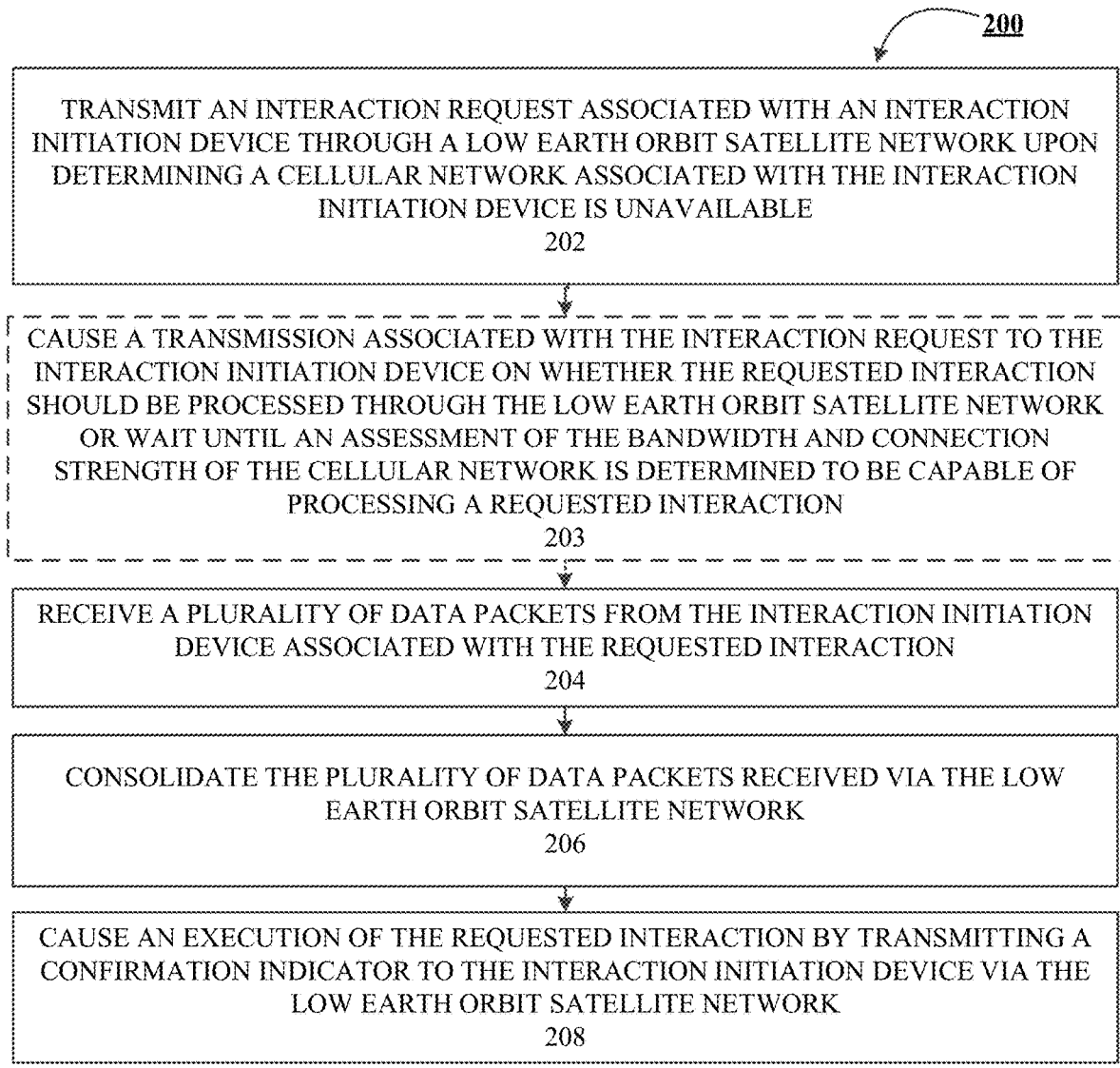
Figure 3:
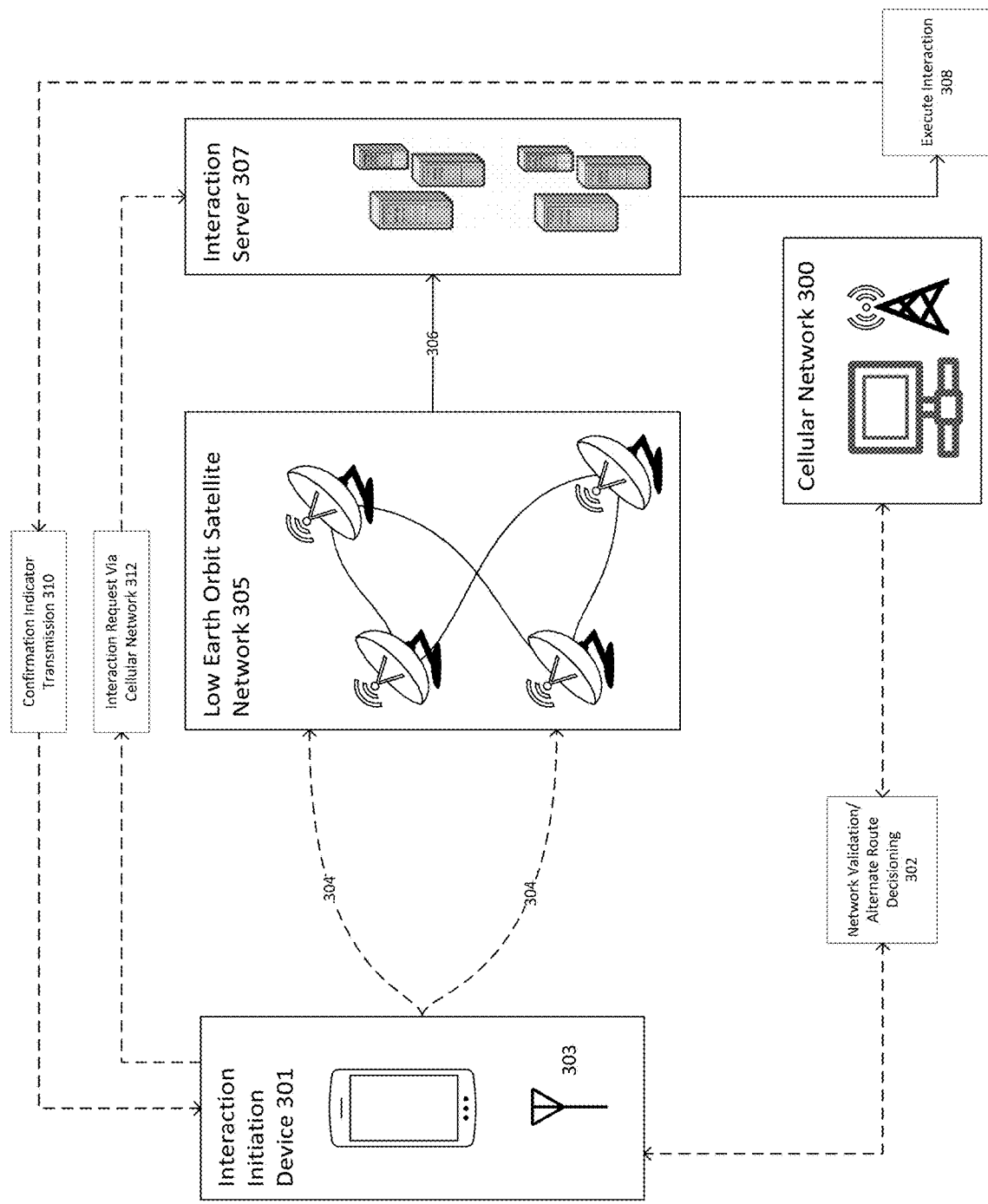
Figure 4:
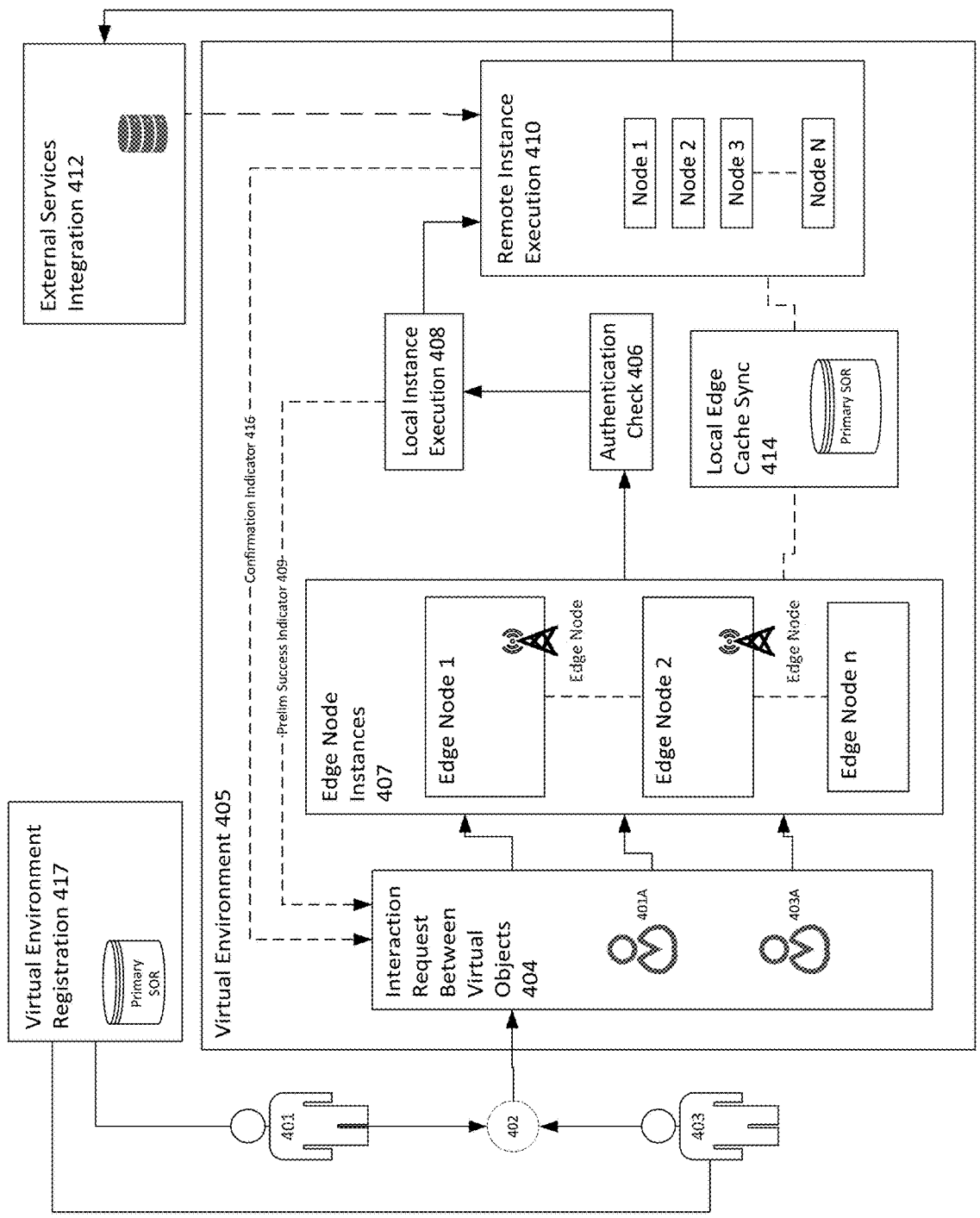

FIGS. 1A-1C illustrates technical components of an exemplary distributed computing environment for interaction system resiliency by aggregation with heterogenous communication networks, in accordance with an embodiment of the disclosure;

FIG. 2 illustrates a process flow for interaction system resiliency by aggregation with heterogenous communication networks, in accordance with various embodiments of the disclosure;

FIG. 3 illustrates an example environment for processing an interaction request transmission through a low earth orbit satellite network, in accordance with various embodiments of the disclosure; and FIG. 4 illustrates an example environment for providing interaction system resiliency through a virtual environment between users and their respective virtual objects, in accordance with various embodiments of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Metaverse, as an evolving paradigm of the next generation Internet, aims to build a fully immersive, and self-sustaining virtual shared space for humans to play, work, and socialize. The metaverse integrates a variety of emerging technologies. The metaverse is the convergence of, (i) virtually enhanced physical reality, and (ii) physically persistent virtual space. It is a fusion of both, while allowing users to experience it as either. Accordingly, as used herein, "virtual environment" may refer to a metaverse environment As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (e.g., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, a "cellular network" or "mobile network" may refer to a telecommunications network where the link to and from end nodes is wireless and the network is distributed over areas or "cells". Cells within the cellular network may be divided into a pattern dependent on a given terrain and reception characteristics of a region. The shape in which cells are formed include but are not limited to hexagons, squares, and circles. The cellular network may be served by at least one fixed-location or at least one mobile transceiver. Network service, provided by the cellular network, may be used for transmission of data, sound, pictures, videos, and the like. Cellular networks may further utilize multiple frequencies to transmit data.

The present disclosure provides a system for interaction system resiliency through aggregation with heterogenous communication networks. The resiliency of a transaction or interaction to be transmitted is strengthened through alternative communication routes in the event of a paused or incomplete transaction. For example, a mobile device initiating a transaction in an area with an unavailable cellular network may not be able to complete the transaction. Instead, the transaction may be able to be completed through transmission of the transaction through a low earth orbit satellite network, which includes a plurality of heterogenous communication networks. The plurality of communication network transmissions can then be consolidated into one transaction request and the transaction can be appropriately recorded (source of records updated and transaction executed). Interaction system resiliency can further be observed in a virtual environment, wherein an interaction unable to be processed through local edge nodes may instead be processed through remote execution.

The transmission of information from one device to another has a strong dependency on network availability, particularly for transactions processed digitally. In areas with underdeveloped cellular network infrastructure, digital transactions may not be fully processed or unable to be completed. Incomplete transactions may further lead to disputed transactions or an inability to conduct transactions in regions with underdeveloped cellular infrastructure.

The transmission of transactions through agnostic infrastructure through a low earth orbit satellite network may promote the completion of transactions through heterogenous networks. A transaction initiated through an electronic device with capabilities of communicating with the low earth orbit satellite network may transmit the transaction through the low earth satellite network if the electronic device finds the cellular network to be unavailable. Transmission of the transaction and the data packets comprised within the transaction may be transmitted across a plurality of networks through the low earth orbit satellite network. Upon reception of the transaction request and the data packets, a server may consolidate requests received by comparing information relating to the transactions on the data packets. Comparing the information of the data packets, multiple requests for the same transaction can be recognized as one transaction, the server may transmit a confirmation indicator to the electronic device via the low earth satellite network and subsequently cause the transaction to be processed. The transmission of transaction through agnostic infrastructure can further be applied to a virtual environment, wherein an interaction between users may rely on an initial method of transmission (such as local instance execution) and instead use remote instance execution to transmit an interaction.

Accordingly, the present disclosure provides a system for transaction or interaction system resiliency by aggregation with heterogenous communication networks. Transactions initiated from a device (such as a mobile phone) rely on cellular networks to complete a transaction. As such, if the cellular network is unavailable, there is an area with poor cellular infrastructure, or the transaction is unable to be completed, the transaction initiating device use connection sensors within the device to connect to a low earth orbit satellite (LEOS) mesh network. The LEOS mesh network can transmit the transaction through multiple communication networks, allowing the transaction to be processed. Multiple transmissions through the LEOS mesh networks can be consolidated using data packets contained within the transaction, meaning if multiple requests for the same transaction are received only one transaction is processed. The transaction resiliency system can further be extended to a virtual environment, such as the metaverse. A transaction triggered within the virtual environment can be transmitted through local edge nodes, then rely on remote nodes and a retry mechanism to resubmit the transaction and update the source of records.

What is more, the present disclosure provides a technical solution to a technical problem. As described herein, the technical problem includes the inability and difficulties associated with transmission of an interaction request via a cellular network. The technical solution presented herein allows for an interaction to be transmitted through agnostic infrastructure and consolidate interaction requests from heterogenous networks. In particular, the interaction system resiliency through aggregation of heterogenous communication networks is an improvement over existing solutions to transmission of interactions solely through a cellular network. Furthermore, the technical solution described herein uses a rigorous, computerized process to perform specific tasks and/or activities that were not previously performed.

FIGS. 1A-1C illustrate technical components of an exemplary distributed computing environment for interaction system resiliency by aggregation with heterogenous communication networks 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low-speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low-speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 is a flow chart 200 that illustrates an example of a method for interaction system resiliency by aggregation with heterogenous communication networks. The method may be carried out by various components of the distributed computing environment 100 discussed herein (e.g., the systems 130, one or more end-point devices 140, etc.). An example system may include at least one non-transitory storage device and at least one processing device coupled to the at least one non-transitory storage device. In such an embodiment, the at least one processing device is configured to carry out the method discussed herein. While the method discussed herein references a resource distribution device, various other automated processing devices may also use the method discussed herein.

Referring now to Block 202 of FIG. 2, the method includes transmitting an interaction request associated with an interaction initiation device through a LEOS network upon determining a cellular network associated with the interaction initiation device is unavailable. An interaction initiation device may be an end-point device 140 that is capable of communicating via a cellular network and/or a LEOS network. For example, the interaction initiation device may be a mobile device that includes communication components that allow for communication via a cellular network and a LEOS network.

In various embodiments, the cellular network associated with the interaction initiation device may be unavailable or otherwise limited for the interaction initiation device (e.g., due to low or no bandwidth, inadequate connection strength, and/or the like). The interaction initiation device may perform an assessment of the availability of the cellular network, which may assess the cellular network to be unavailable. As such, the cellular network may not be available to the interaction initiation device to transmit the interaction request or other communications via the cellular network. As used herein, the term "unavailable" may refer an instance in which the given network is unavailable or otherwise limited (e.g., due to low bandwidth, low connection strength, and/or the like). As such, a cellular network that is unavailable may still have some network capabilities.

The interaction initiation device may perform an assessment of the availability of the cellular network (e.g., testing bandwidth, connection strength, and/or other capabilities) to determine the status of the cellular network (e.g., whether the cellular network is available or unavailable). The assessment of the cellular network may be completed periodically (e.g., at given time intervals) such that the interaction initiation device monitors the cellular network to determine an instance in which the cellular network is available. In an instance in which the cellular network is unavailable, the initiation device may cause the transmission of the interaction request via the LEOS network. In an instance in which the cellular network becomes available, the initiation device may cause the transmission of the interaction request via the cellular network.

In various embodiments, the interaction initiation device may have a connection to the LEOS network capable of transmission running uninterrupted. For example, the interaction initiation device may be able to transmit an interaction request through the cellular network in instances in which the cellular network is available while simultaneously maintaining a connection to the LEOS network ready to transmit the interaction request in case the cellular network becomes unavailable. In other embodiments, connection between the interaction initiation device and the LEOS network may become available depending on the connection between the interaction initiation device and the cellular network.

In various embodiments, the interaction initiation device may transmit one or more data packets (e.g., the interaction request) through the LEOS network in an instance in which the cellular network is unavailable. For example, the interaction request may be transmitted via the LEOS network in an instance in which the interaction request is unable to be transmitted through the cellular network for a predetermined length of time. The predetermined length of time may be determined as a time in which transmission through the cellular network is unlikely to be completed, unachievable, and/or exceeding the average time for a transmission to be completed through the cellular network. For example, the predetermined length of time may be set to 15 seconds between initial transmission of the interaction request through the cellular network and the completion of the interaction request. If the interaction request has not been completed within 15 seconds after initial transmission, the interaction initiation device may transmit the interaction request through the LEOS network.

The interaction initiation device may determine the cellular network availability is unlikely to change within a given amount of time. For example, the interaction initiation device may be in an area that the cellular network is typically unavailable and as such, no restoral of the cellular network is expected as long as the interaction initiation device is in the area. The interaction initiation device may have a global positioning system (GPS) that indicates the location of the interaction initiation device. The location, in turn may be used to determine if the interaction initiation device is in an area where the cellular network is unavailable. In other embodiments, in instances in which the interaction initiation device may be in a location in which cellular network connection has historically been unavailable, the interaction initiation device may determine the cellular network availability is unlikely to change. In other embodiments still, determination that the cellular network availability is unlikely to change may be determined through analysis of the availability of the cellular network. For instance, the interaction initiation device may assess the availability of the cellular network periodically through a predetermined length of time (every minute for example). If a predetermined number of previous assessments of the availability of the cellular network have determined the cellular network to be unavailable, restoral of the cellular network may not be expected.

In some embodiments, the interaction initiation device may determine that transmission through the LEOS network is considered more secure than transmission through the cellular network at a specific location or time. For example, the cellular network at a given location may be a secondary or otherwise less secure network than the LEOS network and as such, the interaction request may be transmitted via the LEOS network (e.g., the cellular network may be deemed unavailable in an instance in which the LEOS network is more secure than the cellular network).

In various embodiments, the interaction request may be transmitted via the cellular network and the LEOS network. For example, the interaction request may be transmitted via the LEOS network in an instance in which the cellular network is unavailable, and the interaction request may also be transmitted again via the cellular network in an instance in which the cellular network becomes available. As such, the transmission of the interaction request through both the cellular network and the LEOS network may occur asynchronously.

Referring now to optional Block 203 of FIG. 2, the method may include causing a transmission associated with the interaction request to the interaction initiation device on whether the requested interaction should be processed through the LEOS network or wait until an assessment of the bandwidth and connection strength of the cellular network is determined to be capable of processing a requested interaction. The transmission of the interaction request from the interaction initiation device through the LEOS network may be preceded by a transmission to the interaction initiation device with a prompt asking if the LEOS network should be utilized or attempted.

In some embodiments, transmission through the LEOS network may be available after prompting the interaction initiation device on whether the LEOS network should be utilized or continue transmission of the interaction request through the cellular network. For example, an interaction initiation device may initiate an interaction, but the interaction is not initially fully executed through the cellular network. The interaction initiation device may be given the choice of transmission through the LEOS network or continue to attempt to transmit the interaction request through the cellular network. Prompting the interaction initiation device may include the option of continued assessment of the bandwidth and connection strength of the cellular network before utilizing the LEOS network for transmission of the interaction request. Further, transmission of the interaction request through the LEOS network may still include attempted transmission through the cellular network.

Referring now to Block 204 of FIG. 2, the method includes receiving a plurality of data packets from the interaction initiation device associated with the requested interaction. At least one of the plurality of data packets may be received through the LEOS network, and at least one or more of the plurality of data packets include identifying characteristics associated with the interaction initiation device. The plurality of data packets included in the interaction request may refer to a basic unit of communication over the cellular network or LEOS network. Identifying characteristics within a data packet may include identifying information such as a token associated with the interaction request. The token may include an identification number, code, or string of characters associated with the interaction. The plurality of data packets may include critical data packets, or data packets that enable the interaction to be processed. The identifying characteristics associated with the interaction initiation device may further include an interaction identification number or code, an identification number or code associated with the interaction initiation device, recipient or delivery information, and other identifying information related to the interaction. An interaction request may contain a plurality of data packets and a plurality of critical data packets, where both the plurality of both may contain identifying characteristics.

Referring now to Block 206 of FIG. 2, the method includes consolidating the plurality of data packets received via the LEOS network. Consolidation of the plurality of data packets may include sorting data packets associated with the same interaction request. For example, an interaction request may be sent through the LEOS network and the cellular network. Both interaction requests and the plurality of data packets within each request may be received, but identifying characteristics found in the plurality of data packets enables the separate requests to be identified as the same interaction. Consolidation of the of the plurality of data packets may occur through assessment of the identifying characteristics. For instance, a plurality of interaction requests transmitted from the cellular network and multiple networks included within the LEOS network may have identifying characteristics that indicate the plurality of interaction requests are associated with the same interaction. A transmission of the interaction request through the LEOS network may further include a plurality of interaction requests through the networks within the LEOS network. Consolidation of these requests enables the plurality of interaction requests to be received and process the interaction once as opposed to one time per interaction request received.

Referring now to Block 208 of FIG. 2, the method includes causing an execution of the requested interaction by transmitting a confirmation indicator to the interaction initiation device via the LEOS network. The confirmation indicator transmitted from an interaction server to the interaction initiation device via the LEOS network may update a source of records within the interaction servers. An update of the interaction, the transfer of resources, the time the interaction took place, the interaction initiation device used for the interaction, and the path in which the data packets were sent (through a cellular network or through the LEOS network) may be recorded on the source of records.

FIG. 3 is an example environment diagram to be used for interaction system resiliency by aggregation with heterogenous communication networks. As such, unless otherwise stated, the environment diagram of the FIG. 3 is capable of performing the operations shown in FIG. 2 and discussed herein. As shown in FIG. 3, the system may include a cellular network 300, an interaction initiation device 301, a connection sensor 303, a LEOS network 305, and the interaction servers 307. The interaction may be transmitted via a cellular network or through the LEOS network 305 to the interaction servers 307.

As shown in reference 302 of FIG. 3, the interaction initiation device 301 attempts to connect and validate the cellular network 300. The cellular network 300 may also attempt to connect and validate the interaction initiation device 301. The connection between the cellular network 300 and the interaction initiation device 301 may be assessed and validated at predetermined intervals of time by both the interaction initiation device and the cellular network. Network validation 302 may occur throughout the interaction transmission process, providing feedback to the interaction initiation device 301 on the connection status to the cellular network. The interaction initiation device 301 is installed with a connection sensor 303 that enable communication of the interaction initiation device with the LEOS network 305. The interaction initiation device 301 may be an end point-device 140 as seen in FIGS. 1A and 1C, where the interaction initiation device may be represented by the various forms of electronic devices of the end-point device. Similarly, the network 110 may be a cellular network 300 or the LEOS network 305 from FIG. 1A, and the system 130 may be the interaction servers 307 from FIG. 1B. The interaction initiation device 301 may further be able to initiate an interaction, and an interaction is able to be proposed, accepted, negotiated, and/or otherwise conducted at least partially through the interaction initiation device. Access and/or connection to the cellular network 300 may be determined through the interaction initiation device 301.

As shown in reference 304 of FIG. 3, if the cellular network 300 associated with the interaction initiation device 301 is determined to be unavailable, unstable, have low bandwidth, poor connection strength, unsecure connection, or otherwise determined to be unable to transmit and/or process the interaction request under predetermined conditions, the interaction initiation device may transmit and/or process the interaction request through the LEOS network 305. The interaction initiation device 301 device may attempt to transmit the interaction electronically through the LEOS network 305 upon determination of the unavailability of the cellular network associated with the interaction initiation device. Transmission of the interaction request can be initiated through the LEOS network 305 or, if the interaction request via the cellular network as seen in reference 312 is determined to be unable to be completed, the interaction request may be transmitted through the LEOS network.

Determination of the cellular network to be unable to transmit an interaction request via the cellular network 312 may be based on a predetermined length of time passing between an attempted transmission of an interaction request through the cellular network and the interaction initiation device receiving a confirmation indicator. The predetermined length of time may be a length of time used to measure the instance in which a transmission of the interaction request through the cellular network is unavailable or transmission through the LEOS network 305 may be faster. Initiation of the interaction request through the LEOS network may be initiated if the interaction request has previously attempted to be transmitted via cellular network 312. The attempted transmission of the interaction request via the cellular network 312 may be recovered through the transmission of the interaction request through the LEOS network 305. Furthermore, the interaction initiation device 301 may be able to assess and determine the availability of the cellular network 300 continuously, and at any point during the interaction process. Similarly, determination of the cellular network 300 to be available for the interaction process may enable the interaction initiation device 301 to switch to the cellular network during any point in the interaction process.

The interaction initiation device 301 may further receive a transmission associated with the interaction request if the cellular network is determined to be unavailable or unable to transmit the interaction request. The transmission may enable the interaction initiation device 301 to determine whether the requested interaction should be processed through the LEOS network or wait until an assessment of the bandwidth and connection strength of the cellular network is determined to be capable of processing a requested interaction. For example, if an interaction request is initially transmitted through the cellular network 312, and the cellular network has low bandwidth or a weak connection, the interaction initiation device 301 may be given the option for transmission of the interaction request through the LEOS network 305.

The connection sensor 303, may be an element that is included within the interaction initiation device 301 that may be capable of communication with the LEOS network 305. The connection sensor 303 may be a part, interface, or ability of the interaction initiation device 301 that may transmit and/or receive messages or interactions (such as interaction requests) with the LEOS network 305. Communication via the connection sensor 302 within the interaction initiation device 301 may enable the interaction initiation device to transmit, process, and/or receive data, data packets, or other information relevant to the interaction through the LEOS network 305.

The interaction request initiated by the interaction initiation device 301 may include a plurality of data packets. The data packets within the plurality may in turn include a proposed resource transfer, as described above. The plurality of data packets may include identifying characteristics associated with the interaction initiating device 301, the interaction requested, origin of the interaction request, recipient of the resource transfer, and other identifying information relating to the interaction. Identifying characteristics related to the interaction may include location from which the interaction was initiated, the time at which the interaction was initiated, items within the interaction request, the size and/or scale of the resource transfer, or a token associated with the interaction request identifying the interaction initiating device 301 and accompanying interaction.

The LEOS network 305 may include at least one low earth orbit satellite, a receiver, a transmitter, and supporting materials to process the interaction initiated by the interaction initiation device 301. The LEOS network 305 may enable the interaction request containing a plurality of data packets to be transmitted through a plurality of networks within the LEOS network. The LEOS network 305 may include a plurality of heterogenous communication networks, in which the interaction request may be transmitted. The plurality of heterogenous communication networks may include types of cellular and mobile networks such as global system for mobile communication (GSM), general packet radio service (GPRS), code division multiple access (CDMA), mobitex, and/or enhanced data for global evolution (EDGE).

Transmission of the interaction request through the LEOS network 305 may be a dynamic process in which a communication network within the LEOS network may be used for transmission due to analysis of the interaction request and the likelihood of its transmission through a particular network. For example, a communication network within the LEOS network may be used for transmission as it is determined to have a more secure connection to the interaction initiation device 301 then other networks, or a second communication network may not be used for transmission as it is determined to be unable to transmit the interaction request. Through each of the heterogenous communication networks, the interaction request and accompanying data packets may be transmitted from the interaction initiation device 301 to the interaction servers 307.

The interaction initiation device 301 may include communication drivers 304A that may establish and secure a connection between the interaction initiation device and the LEOS network 305. The connection sensor 303 within the interaction initiation device 301 may be used with the connection drivers to maintain the connection between the interaction initiation device and the LEOS network 305.

As seen in reference 306 in FIG. 3, the interaction request and the accompanying data packets would be transmitted through the LEOS network 305 to the interaction servers 307. The interaction servers 307 may be capable of receiving data transmitted through both the LEOS network 305 and the cellular network 300. An interaction, interaction request, and/or transmission originating from the interaction initiation device 301 may be received by the interaction servers 307 through the LEOS network 305 and the cellular network 300.

The interaction servers 307 (acting as the system 130 as seen in FIGS. 1A and 1B) may further be capable of consolidating a plurality of interaction requests and the data packets of which the interaction request may contain transmitted from either the LEOS network 305 and/or the cellular network. The interaction requests received by the interaction servers 307 may be consolidated through the identifying characteristics associated with the interaction request and its accompanying data packets. Consolidation may occur through comparison of the data packets received from each interaction request. The information of which the data packets may contain may enable the interaction servers 307 to determine if an interaction request for a particular interaction has already been received. For example, the data packets within an interaction request may have an identification number or password associated with a particular interaction. If the interaction servers 307 receive multiple interaction requests and each has the identification number or password associated with that interaction, the interaction server recognizes that there is only one interaction request. Each interaction request with the identification number or password associated with that interaction is requesting one interaction as opposed to multiple requests. Upon consolidation of the interaction requests, a source of records (SOR) may be updated by the interaction servers 307. The SOR may observe, track, record, note, or otherwise update the interaction server 307 and alert, notify, or update the institutions or entities associated with the interaction. The SOR may further be used to update records associated with accounts that may be affected by the interaction request.

The interaction server 307 may further verify the interaction initiation device 301 and the requested interaction through the data packets associated with the interaction request. Identifying characteristics associated with the interaction initiation device 301 may be found in the plurality of data packets, enabling verification of both the interaction initiation device and the interaction request.

As shown in reference 308 in FIG. 3, upon the update of the SOR by the interaction servers 307, the interaction associated with the interaction request may be executed. Execution of the interaction request may cause a transmission of a confirmation indicator through the interaction servers 307 to the interaction initiation device 301 and a receiving device associated with the interaction request. The execution of the interaction from the interaction request may cause a confirmation indicator to be transmitted to the interaction initiation device 301, as seen in reference 310.

An interaction request that fails to be executed may be recovered or retried through transmission of alternative networks within the LEOS network 305. For example, if an interaction request initially transmitted through the cellular network 300 is at least partially transmitted but the interaction has not been executed, the interaction request may be transmitted through the LEOS network 305. Should the interaction be executed during or after the transmission of the interaction request is transmitted through the LEOS network 305, the interaction request may be consolidated within the interaction server 307. The interaction server 307 may use the identifiable information associated with the interaction request and the data packets included within to execute the interaction once even if multiple requests are received. In other embodiments, failure of execution of the interaction request may further cause the transmission of the interaction request through other networks within the LEOS network 305 that had not been initially utilized. The interaction server 307 may record information associated with the failed interaction request upon failure of execution such as the interaction initiation device used, the interaction request information, and/or any data packets that may have been transmitted.

The transmission of the confirmation indicator 310 may occur through the LEOS network 305, through the cellular network or both. The confirmation indicator may be transmitted from the interaction servers 307 to the interaction initiation device 301 to alert the interaction initiation device that the interaction has been processed, the SOR has been updated, and the interaction has been completed.

FIG. 4 is another example environment diagram that illustrates the methods and systems of the present disclosure being used in a virtual environment. As such, FIG. 4 illustrates interaction system resiliency through a virtual environment 405 between a first user 401 and a second user 403 and their respective virtual objects (e.g., avatars). A first user 401 may be represented through the first virtual object 401A and a second user 403 may be represented through the second virtual object 403A within a virtual environment 405. An interaction request may be initiated by the first user 401 through the first virtual object 401A to the second virtual object 403A associated with the second user 403. Processing of the interaction request may be transmitted through edge node instances 407. Edge node instances 407 may refer to a portal for communication with other nodes, with each node connecting to a different portal for communication. Transmission of the interaction request through the edge node instances 407 may proceed to validation and authentication of the interaction request.

Upon validation and authentication, the interaction request may be transferred to a local instance execution 408. An interaction request received by the local instance execution 408 may be executed by the local instance execution 408. After execution of the location interaction request, a preliminary success indicator 409 may be transmitted to the first virtual object 401A and the second virtual object 403A. If the interaction request is unable to be executed by the local instance execution 408, the interaction request may be transferred to the remote instance execution 410. The remote instance execution 410 may be independent of the local instance execution 408 and may queue the interaction request. The remote instance execution 410 may exchange data with an external services integration 412 and may then execute the interaction request, sending a confirmation indicator 416 to both the first virtual object 401A and the second virtual object 403A.

As seen in reference 402, the first user 401 and the second user 403 may provide pertinent information to the virtual environment 405 to utilize, control, direct, manipulate, or otherwise interact with the virtual environment and their respective virtual objects (e.g., the first virtual object 401A and the second virtual object 403A). The pertinent information may include information (such as names, area of residency, identification information, and the like) that enables the first user 401 and the second user 403 to generate, negotiate, or otherwise modify an interaction request or resource transfer. The first user 401 and/or second user 403 may provide the pertinent information or have the pertinent information stored in the virtual environment registration 417. In further embodiments, an interaction request may include a plurality of users and their respective virtual objects. In other words, an interaction request between more than two users, entities, or virtual objects may be conducted. Additional users may be represented in the virtual environment (e.g., a third user may have a corresponding third virtual object, a fourth user may have a corresponding fourth virtual object, etc.).

In various embodiments, the virtual environment 405 may be a three-dimensional virtual space in which users can interact with one another and the environment in real-time. The virtual interaction session may be established based on specific needs of the users interacting therewithin. For example, entities such as financial institutions may establish an interaction request with their customers to provide products and services via the virtual environment 405 without having the customers appear in person to a physical location of the entity. As such, in instances in which a customer (e.g., the first user 401) wishes to interact with an employee (e.g., the second user 403) of the entity, the customer may request that their interaction be within the virtual environment. To this end, the customer may use a user input device to log into a proprietary portal (e.g., application) associated with the entity using their authentication credentials, and upon successful verification of their authentication credentials, the customer may request that an interaction request be established for real-time communication with the employee. In some embodiments, the employee may already be logged into the virtual environment 405 in anticipation of a customer. In such cases, the employee may receive a notification indicating that the customer has requested that an interaction be established for real-time communication with the employee.

An interaction request may be formed between the first virtual object 401A and the second virtual object 403A as shown in Block 404. The interaction request may be formed between the first user 401 and the second user 403 through their respective virtual objects. Each virtual object may be served by the nearest available edge node to the virtual object, as seen in the edge node instances 407. For example, the first virtual object 401A may be closest to Edge Node 1, while the second virtual object 403A may be closest to Edge Node 2. Further edge nodes (such as edge node n) may be selected based on predetermined selection factors.

The edge node used within the edge node instances 407 to transmit the interaction for either the first virtual object 401A or the second virtual object 403A may be determined through analysis of the possible edge nodes. An edge node within the edge node instances 407 may be selected as it was closest in proximity to a user, the edge node was determined to be a secure edge node to transmit the interaction request, and/or the edge node is determined to be capable of transmitting the interaction request successfully. In various embodiments, the nearest available edge node to a virtual object may respond to data queries and to requests, where both requests can be satisfied independently of external services or sources of records. The edge node instances 407 may further enable transmission of the interaction request to the authentication check 406.

In various embodiments, the authentication check 406 may authenticate the interaction request, the first user 401, the second user 403, the first virtual object 401A, the second virtual object 403A, and any further entities or resources involved in the interaction request. The authentication check 406 may further validate the local edge node instances 407 used in the transmission of the interaction request. Guidelines and regulations governing interaction requests within the virtual environment 405 may be enforced through the authentication check 406, enabling interaction requests that follow any rules, mandates, or laws within the virtual environment. Upon authentication, the interaction request may be transmitted to the local instance execution 408.

The local instance execution 408 may execute preliminary steps and respond with confirmation. Preliminary steps may include the transmission of a preliminary success indicator 409, which may be received by both the first virtual object 401A and the second virtual object 403A. Transmission of the preliminary success indicator 409 may be conducted through a separate edge node than the previously utilized edge node instances 407. If an interaction request is unable to be processed by the local instance execution 408, remote instance execution 410 may be provided. Interaction requests received by the local instance execution 408 may be transferred to the remote instance execution 410 to reduce the number of interaction requests processed through the local instance execution (i.e., interaction requests could be processed faster through the remote instance execution, the local instance execution is experiencing some form of technical issues, an interaction request has failed to process an interaction request, etc.). Interaction requests may be dynamically moved between the local instance execution 408 and the remote instance execution 410 to ensure neither system is overwhelmed or reduced in its ability to process an interaction request.

In an instance in which the interaction request is transmitted to the remote instance execution 410, information associated with the interaction request may be sent to the external services integration 412. The external services integration 412 may provide additional information associated with the interaction request. The external services integration may be able to diagnose the issues which caused the interaction request being processed through the local instance execution 408 to be transferred to the remote instance execution 410, and subsequently suggest resolutions to the issues which caused the transfer. The external services integration 412 may be able to provide resolutions to the issues which caused the transfer of the interaction request to the remote instance execution 410.

Referring now to the remote instance execution 410, the interaction request may be queued and resubmitted within the virtual environment 405 until the interaction is determined to be successful. Remote instance execution 410 may maintain a queue of interaction requests and may resubmit an interaction request waiting in the queue. Interaction requests within the queue may be resubmitted through a retry mechanism within the remote instance execution 410. The interaction request upon successful submission may transmit a confirmation indicator 416 (asynchronously with the preliminary success indicator) to the first virtual object 401A and the second virtual object 403A. Resubmission of the interaction request through the remote instance execution 410 may utilize remote nodes to process the interaction request.

In various embodiments, execution of the interaction request through either the edge node instances 407 or the remote instance execution 410 may update the primary source of record (Primary SOR) within the local edge cache sync 414. Primary SORs within the local edge cache sync may be updated for both the first user 401 and the second user 403 for the interaction request conducted through their respective virtual objects.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for resiliency by interaction aggregation with heterogenous communication networks, the system comprising:
   at least one non-transitory storage device; and
   at least one processing device coupled to the at least one non-transitory storage device, wherein the at least one processing device is configured to:
   transmit an interaction request associated with an interaction initiation device through a low earth orbit satellite network upon determining a cellular network associated with the interaction initiation device is unavailable;
   receive a plurality of data packets from the interaction initiation device associated with the requested interaction, wherein at least one of the plurality of data packets are received via the low earth orbit satellite network, wherein one or more of the plurality of data packets comprise identifying characteristics associated with the interaction initiation device;
   consolidate the plurality of data packets received via the low earth orbit satellite network; and
   cause an execution of the requested interaction by transmitting a confirmation indicator to the interaction initiation device via the low earth orbit satellite network.

2. The system of claim 1, wherein in assessing a bandwidth and connection strength of the cellular network to the interaction initiation device, the system is further configured to:
   transmit the interaction request associated with the interaction initiation device through the low earth orbit satellite network after a predetermined length of time has passed since the confirmation indicator has been received by the interaction initiation device prior to an attempted transmission through the cellular network;
   consolidate the plurality of data packets associated with the interaction initiation device received from the cellular network and the low earth orbit satellite network; and
   recover the plurality of data packets associated with the requested interaction transmitted through the cellular network wherein the predetermined length of time has passed since the confirmation indicator has been received by the interaction initiation device prior to the attempted transmission through the cellular network.

3. The system of claim 1, wherein the system is further configured to cause a transmission associated with the interaction request to the interaction initiation device on whether the requested interaction should be processed through the low earth orbit satellite network or wait until an assessment of a bandwidth and connection strength of the cellular network is determined to be capable of processing a requested interaction.

4. The system of claim 1, wherein the consolidation of the plurality of data packets comprises determining whether the plurality of data packets received are associated with the same requested interaction based on the identifying characteristics associated with the interaction initiation device.

5. The system of claim 4, wherein the system is further configured to verify the interaction initiation device and the requested interaction through the data packets comprising identifying characteristics associated with the interaction initiation device.

6. The system of claim 1, wherein the confirmation indicator updates a source of records with the requested interaction request.

7. The system of claim 1, wherein the unavailable cellular network associated with the interaction initiation device is a cellular network with a low strength connection to the associated interaction initiation device.

8. A computer program product for resiliency by interaction aggregation with heterogenous communication networks, the computer program product comprising at least one non-transitory computer-readable medium having computer-readable program code portions embodied therein, the computer-readable program code portions comprising:

an executable portion configured to transmit an interaction request associated with an interaction initiation device through a low earth orbit satellite network upon determining a cellular network associated with the interaction initiation device is unavailable;

an executable portion configured to receive a plurality of data packets from the interaction initiation device associated with the requested interaction, wherein at least one of the plurality of data packets are received via the low earth orbit satellite network, wherein one or more of the plurality of data packets comprise identifying characteristics associated with the interaction initiation device;

an executable portion configured to consolidate the plurality of data packets received via the low earth orbit satellite network; and an executable portion configured to cause an execution of the requested interaction by transmitting a confirmation indicator to the interaction initiation device via the low earth orbit satellite network.

9. The computer program product of claim 8, wherein in assessing a bandwidth and connection strength of the cellular network to the interaction initiation device, the computer program product further comprises an executable portion configured to transmit the interaction request associated with the interaction initiation device through the low earth orbit satellite network after a predetermined length of time has passed since the confirmation indicator has been received by the interaction initiation device prior to an attempted transmission through the cellular network;

an executable portion configured to consolidate the plurality of data packets associated with the interaction initiation device received from the cellular network and the low earth orbit satellite network; and an executable portion configured to recover the plurality of data packets associated with the requested interaction transmitted through the cellular network wherein the predetermined length of time has passed since the confirmation indicator has been received by the interaction initiation device prior to the attempted transmission through the cellular network.

10. The computer program product of claim 8, wherein the computer program product further comprises an executable portion configured to cause a transmission associated with the interaction request to the interaction initiation device on whether the requested interaction should be processed through the low earth orbit satellite network or wait until an assessment of a bandwidth and connection strength of the cellular network is determined to be capable of processing a requested interaction.

11. The computer program product of claim 8, wherein the consolidation of the plurality of data packets comprises determining whether the plurality of data packets received are associated with the same requested interaction based on the identifying characteristics associated with the interaction initiation device.

12. The computer program product of claim 11, wherein the computer program product further comprises an executable portion configured to verify the interaction initiation device and the requested interaction through the data packets comprising identifying characteristics associated with the interaction initiation device.

13. The computer program product of claim 8, wherein the confirmation indicator updates a source of records with the requested interaction request.

14. The computer program product of claim 8, wherein the unavailable cellular network associated with the interaction initiation device is a cellular network with a low strength connection to the associated interaction initiation device.

15. A method for resiliency by interaction aggregation with heterogenous communication networks, the method comprising:

transmitting an interaction request associated with an interaction initiation device through a low earth orbit satellite network upon determining a cellular network associated with the interaction initiation device is unavailable;

receiving a plurality of data packets from the interaction initiation device associated with the requested interaction, wherein at least one of the plurality of data packets are received via the low earth orbit satellite network, wherein one or more of the plurality of data packets comprise identifying characteristics associated with the interaction initiation device;

consolidating the plurality of data packets received via the low earth orbit satellite network; and causing an execution of the requested interaction by transmitting a confirmation indicator to the interaction initiation device via the low earth orbit satellite network.

16. The method of claim 15, wherein in assessing a bandwidth and connection strength of the cellular network to the interaction initiation device, the method further comprising:

transmitting the interaction request associated with the interaction initiation device through the low earth orbit satellite network after a predetermined length of time has passed since the confirmation indicator has been received by the interaction initiation device prior to an attempted transmission through the cellular network;

consolidating the plurality of data packets associated with the interaction initiation device received from the cellular network and the low earth orbit satellite network; and recovering the plurality of data packets associated with the requested interaction transmitted through the cellular network wherein the predetermined length of time has passed since the confirmation indicator has been received by the interaction initiation device prior to the attempted transmission through the cellular network.

17. The method of claim 15, wherein the method further comprises causing a transmission associated with the interaction request to the interaction initiation device on whether the requested interaction should be processed through the low earth orbit satellite network or wait until an assessment of a bandwidth and connection strength of the cellular network is determined to be capable of processing a requested interaction.

18. The method of claim 15, wherein consolidation of the plurality of data packets comprises determining whether the plurality of data packets received are associated with the same requested interaction based on the identifying characteristics associated with the interaction initiation device.

19. The method of claim 18, wherein the method further comprises verifying the interaction initiation device and the requested interaction through the data packets comprising identifying characteristics associated with the interaction initiation device.

20. The method of claim 15, wherein the method further comprises updating a source of records with the requested interaction request.

\* \* \* \* \*